US012523424B1

(12) United States Patent
Wilkinson

(10) Patent No.: US 12,523,424 B1
(45) Date of Patent: Jan. 13, 2026

(54) WOOD DRYING DEVICE

(71) Applicant: Forrest C. Wilkinson, Sartell, MN (US)

(72) Inventor: Forrest C. Wilkinson, Sartell, MN (US)

( * ) Notice: Subject to any disclaimer, the term of this patent is extended or adjusted under 35 U.S.C. 154(b) by 539 days.

(21) Appl. No.: 18/116,718

(22) Filed: Mar. 2, 2023

(51) Int. Cl.
*F26B 7/00* (2006.01)
*F26B 9/06* (2006.01)
*F26B 21/06* (2006.01)
*F26B 23/10* (2006.01)

(52) U.S. Cl.
CPC .................. *F26B 7/00* (2013.01); *F26B 9/06* (2013.01); *F26B 21/06* (2013.01); *F26B 23/10* (2013.01); *F26B 2210/16* (2013.01)

(58) Field of Classification Search
None
See application file for complete search history.

(56) References Cited

U.S. PATENT DOCUMENTS 681,032 A * 8/1901 Bevier ................... B27K 5/001 427/393
4,467,532 A * 8/1984 Drake ....................... F26B 5/04 34/92
4,753,016 A * 6/1988 Eichholz ................. F26B 17/18 122/26
4,893,415 A * 1/1990 Moldrup ................... F26B 5/04 34/406
5,228,209 A * 7/1993 Brunner .................. F26B 25/06 34/73
6,640,462 B1 * 11/2003 Choi ........................ F26B 21/10 34/396
2008/0209759 A1 * 9/2008 Shivvers ................. F26B 11/04 34/514
2011/0271546 A1 * 11/2011 Eriksen ................... F26B 23/10 34/92
2012/0023772 A1 * 2/2012 Abramov ................ F26B 21/06 34/92
2021/0207886 A1 * 7/2021 Parker ...................... F26B 25/22

* cited by examiner

*Primary Examiner* — David J Laux
(74) *Attorney, Agent, or Firm* — Johnson and Phung; Thomas N. Phung

(57) ABSTRACT

A wood drying device that includes a pressure chamber having an interior sized to support a batch of wood therein, a closed-end, an open end, and a chamber door forming an airtight seal, an air compressor providing pressure to the pressure chamber, a vacuum pump evacuating air, recirculation fans located within the pressure chamber, a hot water radiator located within the pressure chamber, a hot water loop partially located within the pressure chamber and supplying heat to the radiator, a water heater located outside of the pressure chamber and connected to the hot water loop, a condenser located within the pressure chamber proximal a floor surface, a cold-water loop supplying chilled water to the condenser, a cold-water radiator located outside the pressure chamber and connected to the cold-water loop, a condensate basin located within the pressure chamber underneath the cold-water loop, and a condensate collection tank located outside the pressure chamber receiving water drips from the condensate basin.

20 Claims, 4 Drawing Sheets

WOOD DRYING DEVICE

FIELD OF THE INVENTION

This invention relates generally to drying wood and, more specifically to an improved device for drying wood.

CROSS-REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

In the production of wood or lumber products such as wood boards, posts, and panels the drying of freshly cut wood is a vital step in producing the lumber used for construction and furniture. There are two main ways to dry wood in the art, namely by having the wood dry naturally through environmental conditions and through the use of a kiln for batch drying of the wood. The kiln is traditionally heated by a burner to dry the wood over a set period of time during which moisture is slowly driven out of the wood and evaporated into the heated air. The moisture driven out of the wood is drained from the kiln and released into the environment, which creates a potential environmental hazard.

In addition, the use of traditional kilns to dry wood typically consumes a great deal of energy, results in an inability to provide uniformly drying of the wood and is a lengthy process with dry times taking months.

The present invention is directed at solving the problems normally associated with the use of traditional kilns to dry wood.

SUMMARY OF THE INVENTION

Briefly, the present invention comprises a wood-drying device that includes a pressure chamber having an interior sized to support a batch of wood therein, a closed end, an open end, and a chamber door forming an airtight seal within the pressure chamber. Connected to the pressure chamber are an air compressor to provide pressure to the pressure chamber during a pressure cycle and a vacuum pump to evacuated air from the pressure chamber during the vacuum cycle.

The wood-drying device also includes a hot water system having a hot water radiator located within the interior of the pressure chamber, a closed, continuous hot water loop partially located within the interior of the pressure chamber and supplying heat to the radiator, a water heater located outside of the pressure chamber and connected to the hot water loop. The water heater functions to feed heated water into the radiator through a radiator inlet while simultaneously receiving circulated water from the radiator through a radiator outlet.

The wood-drying device also includes a cold-water system having a condenser located within the interior of the pressure chamber proximal to a floor surface of the pressure chamber, a closed and continuous cold-water loop supplying chilled water to the condenser, and a cold-water radiator located outside of the pressure chamber and connected to the cold-water loop. The cold-water radiator functions to simultaneously receive water from the condenser and supply chilled water to the cold-water loop;

Located within the interior of the pressure chamber are at least one and preferably at least two recirculation fans to circulate air over the hot water radiator, wood, and condensate coils located within the interior of the pressure chamber. Located within the interior of the pressure chamber underneath the cold-water loop is a condensate basin that functions to catch water drips from the condenser and a condensate collection tank located outside of the pressure chamber for receiving the water drips from the condensate basin.

The wood-drying device further includes at least one wet bulb, at least one dry bulb, and at least one moisture content sensor to monitor conditions inside the pressure chamber during operations and a programmable logic circuit and an automatic electrical controlled valves allow for computer-aided automatic control.

DESCRIPTION OF THE PREFERRED EMBODIMENT

Figure 1:
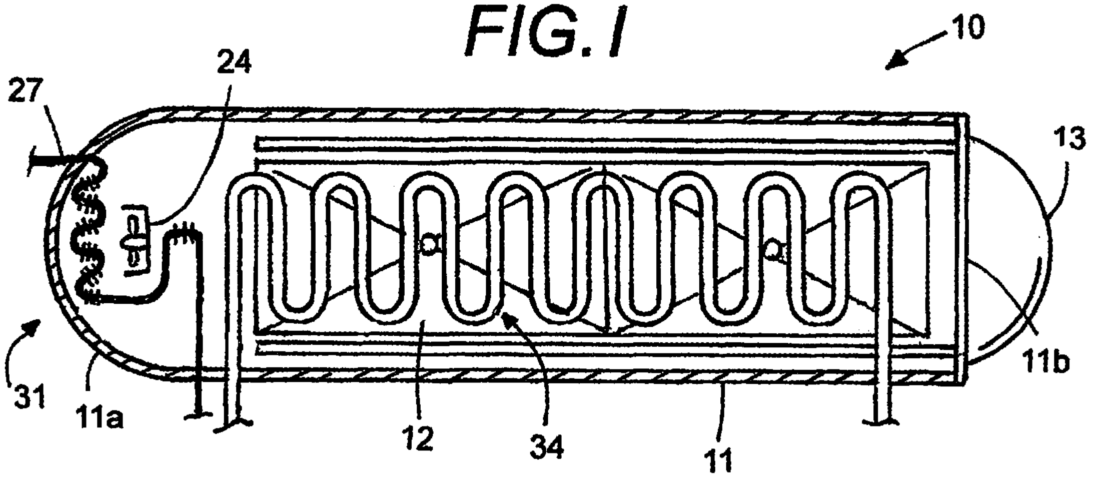
FIG. 1 is a top cross-sectional view of an embodiment of a wood drying device of the present invention.

The general purpose of the present invention, which will be described subsequently in greater detail, is to provide an improved device for drying lumber.

There have thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Figure 2:
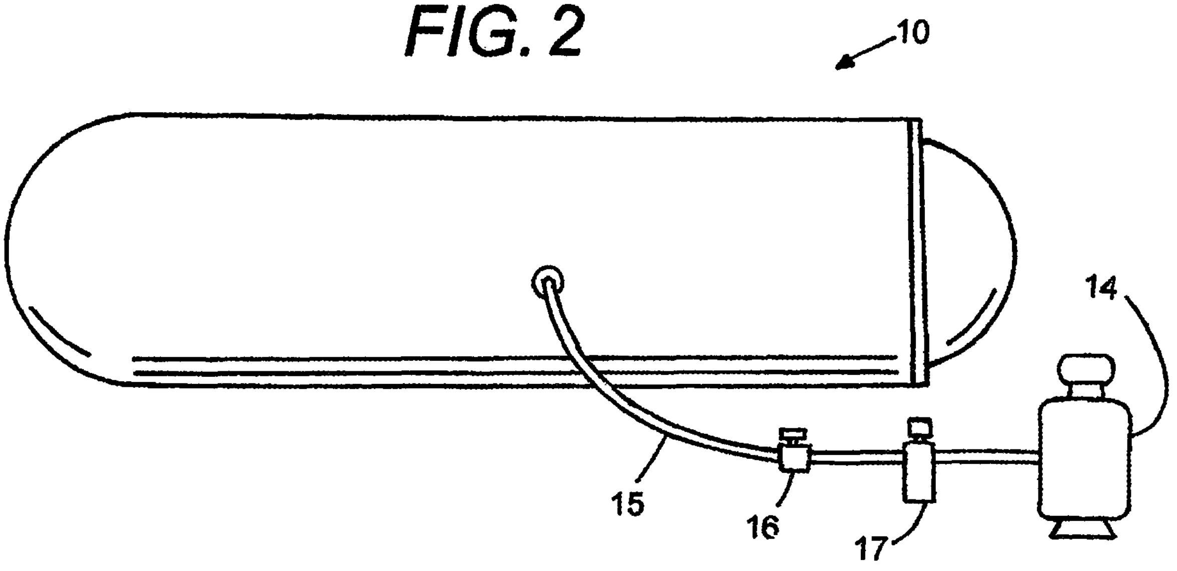
FIG. 2 is a back view of the wood drying device of FIG. 1.
Figure 3:
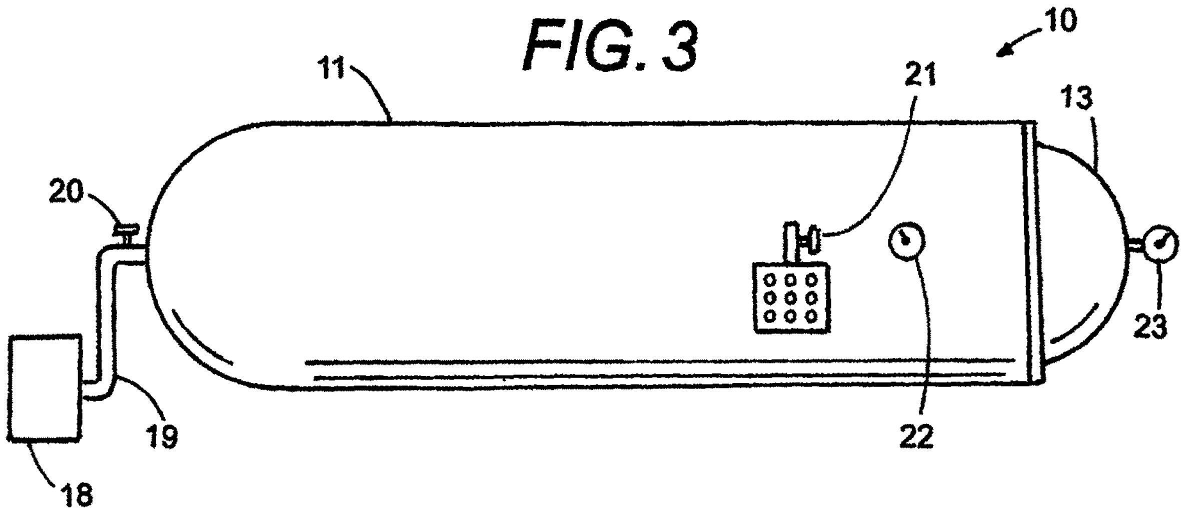
FIG. 3 is a front view of the wood drying device of FIG. 1.

Referring to the drawings, FIG. 1 is a top cross-sectional view, FIG. 2 is a back view, and FIG. 3 is a front view showing an embodiment of a wood drying device 10 of the present which generally comprises a pressure chamber 11 having an interior 12 sized to support a batch of wood such as but not limited to construction lumber therein. Pressure chamber 11 includes a closed end 11*a*, an open-end 11*b*, and a chamber door 13 engageable to the open-end 11*b* of the pressure chamber to form an airtight seal within pressure chamber 11.

The wood drying device 10 includes a hot water system 31 to provide the interior 12 of pressure chamber 11 with a heat source which raises the core temperature of the pressure chamber 11 to a temperature range that promotes the expedited drying of the batch of wood supported within the pressure chamber 11 with a preferred temperature range of between 100° F. to 165° F. and more preferably a temperature range of between 130° F. to 135° F. and a cold-water system 32 to assist in the condensation of water vapor in the air located within the interior 12 of the pressure chamber 11 to liquid water.

In order to circulate the air temperature within the pressure chamber 11, pressure chamber 11 also includes at least one and preferably at least 2 recirculation fan 24 located within the interior 12 of the pressure chamber 11 to circulate heated air within the interior 12 of the pressure chamber 11 and over the hot water radiator, the wood being dried within the pressure chamber 11, and the condensate coils of the condenser 33.

Figure 4:
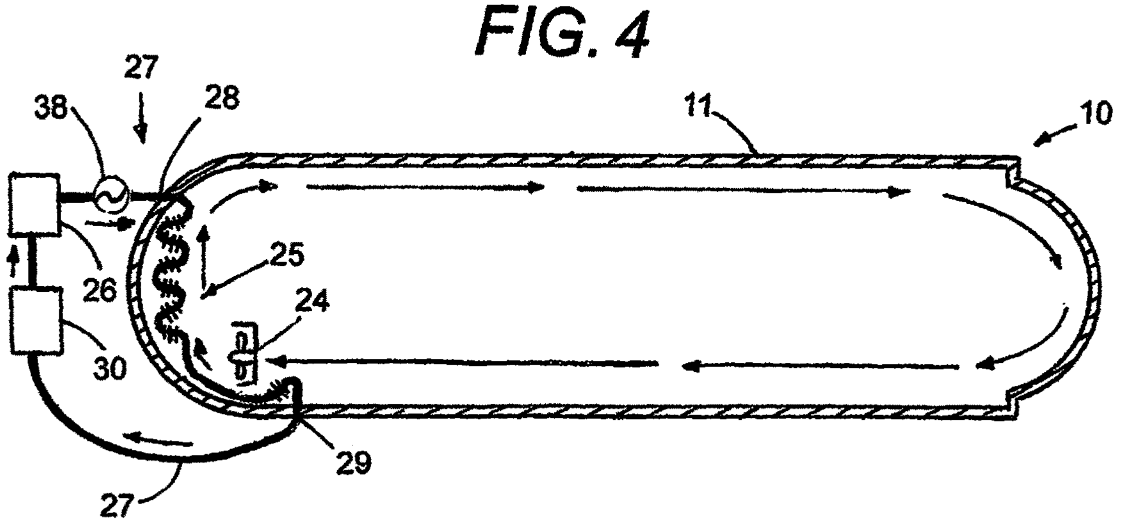
FIG. 4 is a cross-sectional view showing a hot water system and a fan system of the wood drying device of FIG. 1.

FIG. 4 is a cross-sectional view showing the hot water system and a fan system of wood drying device 10. The circulation of the heated air within the pressure chamber 11 enables for the heated air to move through all the corners and surfaces of the batch of wood being dried within the pressure chamber 11 to promote the even and expedited drying of the wood. by pulling out moisture located within the wood into the dried heated air.

The hot water system generally includes a hot water radiator 25 located within the interior 12 of the pressure chamber 11 and a closed and continuous hot water loop 27 partially located within the interior 12 of the pressure chamber 11 and supplying heat to the radiator 25 and partially located outside of the pressure chamber 11.

Located outside of the pressure chamber 11 and connected to the hot water loop 27 is a water heater 26 and a water tank 30. The water heater 26 functions to receive and heat water from the water tank 30 and feed the heated water to a hot water pump 38 which facilitates the transfer of the heated water into the radiator 25 through a radiator inlet 28 while the water tank 30 simultaneously receives circulated water from the radiator 25 through a radiator outlet 29.

The circulation of heated water through radiator 25 will heat the air located proximal the radiator 25. As shown in FIG. 4, in order to evenly distribute the air heated by the radiator 25, the recirculation fan(s) 24 located within the interior 12 of the pressure chamber 11 functions to provide for circulated air movement within the interior 12 of the pressure chamber 11.

As shown in FIG. 2, the wood drying device 10 includes a pressurizing system such as an air compressor 14 connected to chamber 11, such as through a pressure hose 15, to provide pressure to chamber 11 during a pressure cycle. Located on pressure hose 15 between air compressor 14 and chamber 11 is an on-off pressure valve 16 and a pressure regulator 17, which functions to set the pressure within pressure chamber 11 preferably ranging between 0 to 60 psi. By pressurizing the heated air with the air compressor 14, the heated air is able to facilitate the withdrawal of fluids within the wood much quicker and at lower temperatures thereby improving the efficiency of the wood drying proceed compared to the use of traditional kilns.

The wood drying device 10 also includes a vacuum system, which is shown in FIG. 3 as comprising a vacuum pump 18 connected to pressure chamber 11 to evacuate air from the pressure chamber during the vacuum cycle preferably ranging between 0 to 30 atm. The use of the vacuum pump 18 functions to aid in the vaporization of the fluids from the wood in that the vacuum pump 18 will lower the vaporization temperature of the fluids.

In summary, the use of the combined air compressor 14 and vacuum pump 18, in alternating intervals of each other or the back and forth use of the air compressor 14 and vacuum pump 18 within pressure chamber 11, preferably starting with air compressor 14 with the heated air to facilitate the withdrawal of fluids within the wood much quicker and at lower temperatures followed by the use of vacuum pump 18 to aid in the vaporization of the fluids from the wood by lowering the vaporization temperature of the fluids enables the present invention to drastically speed up the wood drying process compared to the use of traditional kilns without the air compressor and vacuum pump. The advantage of the aforementioned include but is not limited to drying the wood at lower temperatures thereby reducing potential damage to the wood due to exposure to higher temperatures during the drying process and reducing the wood drying times from months to weeks. For example, certain types of wood may require a drying time of at least 2 months using traditional kilns whereas the present invention may accomplish the same results in a week's time.

Located on a line connecting the vacuum pump 18 connected to the pressure chamber 11 is an on-off pressure valve 20. The pressure chamber may also include a safety release or relief valve 21 for safety purposes, a temperature gauge 22, a pressure gauge 23 along with wet bulbs and dry bulbs, and moisture content sensors which functions to monitor conditions inside chamber 11 during operations of wood drying device 10. The wood drying device 10 may further include programmable logic circuits (PLCs) and automatic electrical controlled valves that allow for computer-aided automatic control.

Figure 5:
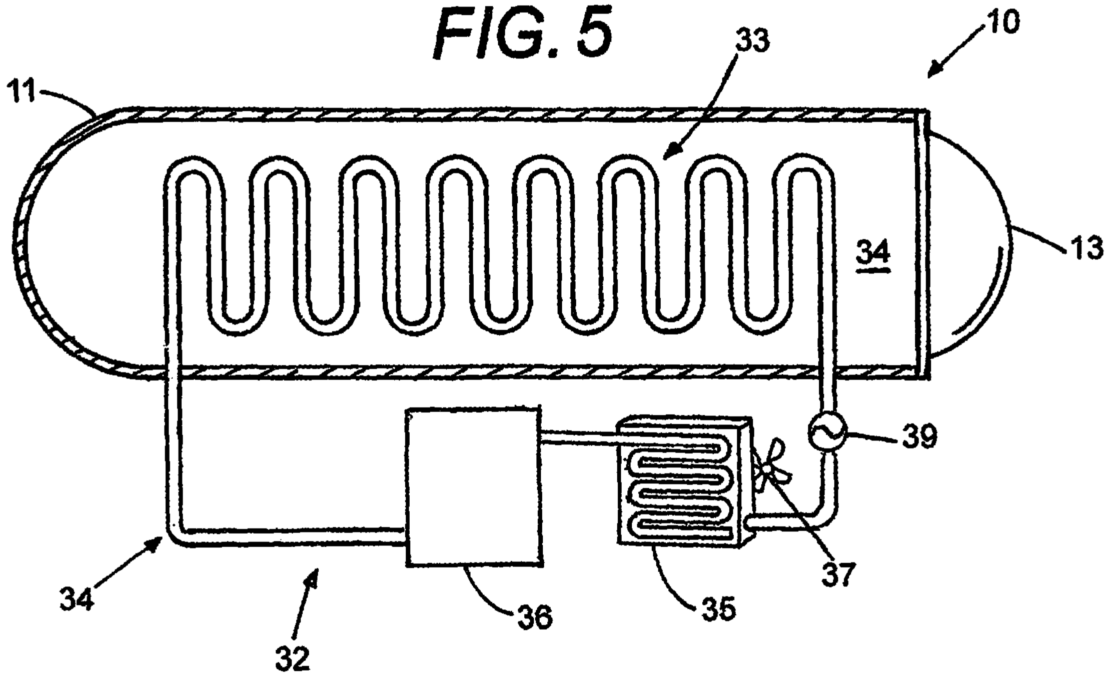
FIG. 5 is a partial cross-sectional view showing the cold-water system of the wood drying device of FIG. 1.

FIG. 5 is a partial cross-sectional view showing the cold-water system 32 of the wood drying device 10 of the present invention. The cold-water system generally includes a condenser 33 located within the interior 12 of the pressure chamber 11 proximal a floor surface 34 of the pressure chamber 11, a closed and continuous cold-water loop 34 supplying chilled water to the condenser 33, and a cold-water radiator 35 located outside of the pressure chamber 11 and connected to the cold-water loop 34. The cold-water radiator 35 is shown in the embodiment of FIG. 5 including a fan 37 to assist in cooling the water located with the cold-water radiator 35.

Also connected to the cold-water loop 34 and located downstream of the cold-water radiator 35 is a cold-water supply tank 36 with the cold-water radiator 35 simultaneously receiving water from the condenser 33 and supplying chilled water to the cold-water supply 36 which in turns supply the chilled water to the cold-water loop 34.

In the operation of the closed and continuous cold-water loop 34, the cold-water supply tank 36 supplies chilled water to condenser 33 located near floor 34 of pressure chamber 11 such as via hose or the like with a return hose leaving chamber 11. After passing through condenser 33 the water leaves the pressure chamber via the hose and passes through radiator 35 which is also known as a heat exchanger located external to the pressure chamber 11 before returning to the cold-water supply tank 26.

The cold-water system 32 further includes a cold-water pump 39 which functions to facilitate the circulation of the water through the closed and continuous cold-water loop 34. Although the pump may be located at various location on the closed and continuous cold-water loop 34, the embodiment of FIG. 5 shows the cold-water pump 39 located between the pressure chamber 11 and the radiator 35.

In operations of the cold-water system 32, the heated air located within the pressure chamber 11 will be moist or contain a high level of moisture or water vapor resulting from the removal of the water from the batch of wood being dried within the pressure chamber 11. The condenser 33 operates to facilitate dry the heated air located within the pressure chamber 11 by removing the water vapor from the air. This is accomplished through the condensation of water vapor in the air of the pressure chamber 11 to a liquid water state.

Figure 6:
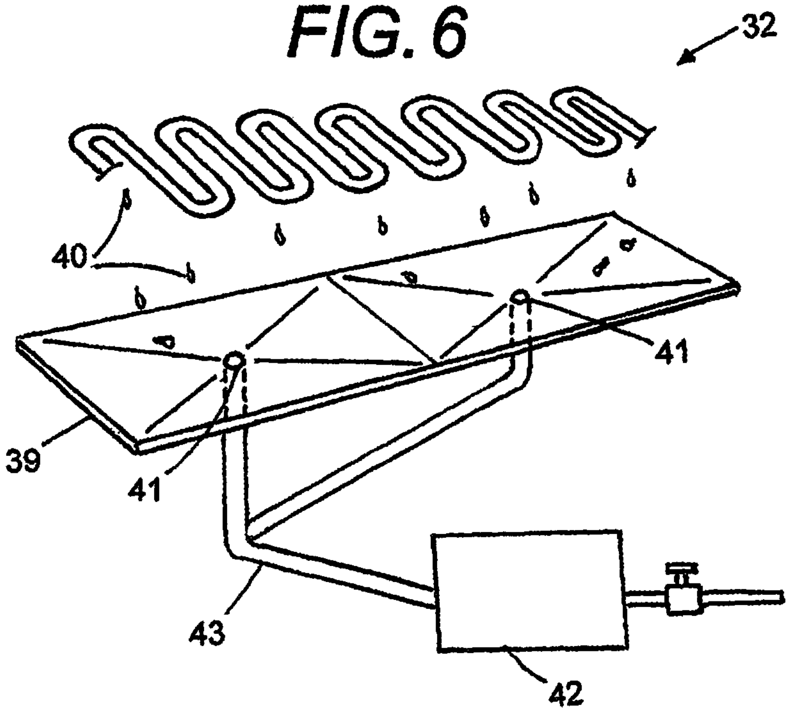
FIG. 6 is an exploded view showing a condensate system for collecting and discharging the condensation liquid.

FIG. 6 is an exploded view showing a condensate system for collecting and discharging the condensation liquid. The condensate system generally includes a condensate basin 39 located within the interior 12 of the pressure chamber 11 underneath the cold-water loop 34 such as the condenser 33 for catching drips of condensation fluids 40 from the condenser 33. The condensate basin 39 includes at least one outlet 41 connected to a hose or tubing 43 which directs the collected condensation fluids 40 out to a condensation collection tank 42.

Figure 7:
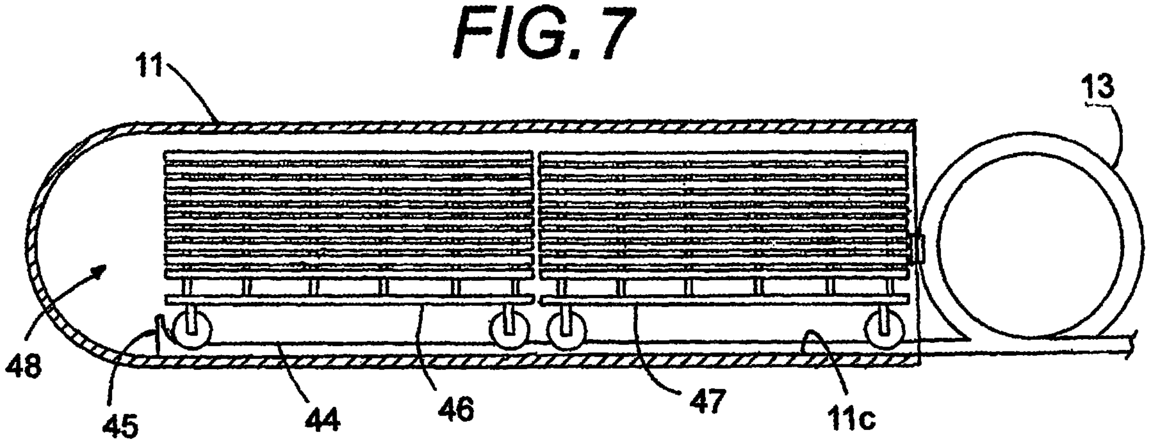
FIG. 7 is a partial cross-sectional view of a pressure chamber having a set of internal rails firmly affixed to a bottom surface of the pressure chamber.

FIG. 7 is a partial cross-sectional view of chamber 11 with the pressure chamber door 13 in an opened condition and showing the feature of a set of internal rails 44 firmly affixed to a bottom surface 11*c* of the interior 12 of the pressure chamber 11. The internal rail 44 includes a stopper 45 located at an end of the internal rails 44 distal to the pressure chamber door 13. Supported on the internal rails 44 is a first kiln kart 46 and a second kiln kart 47 both of which are shown supporting a batch of wood 48 thereon for drying within the pressure chamber 11 and moving the batch of wood 48 into and out from the pressure chamber 11. In order to increase drying efficiency, the batch of wood 48 are shown stacked on the kiln kart 46 and 47 with spacers between each wood board which creates spacing between the boards to allow for the flow of heated air therethrough during the drying process.

Figure 8:
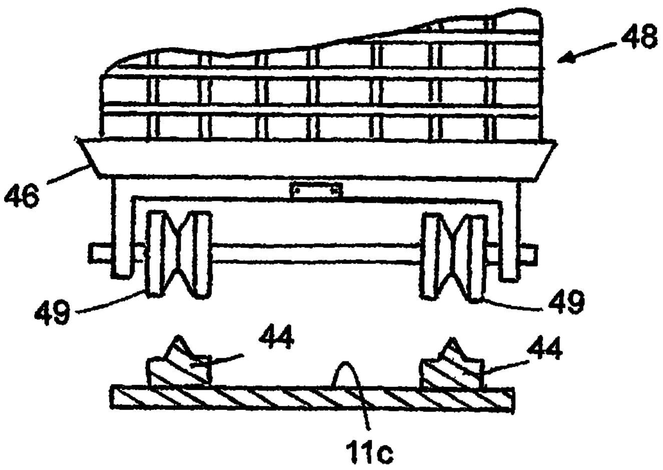
FIG. 8 is an exploded end view showing a set of kart wheels specifically designed to ride on the rails of FIG. 7.

FIG. 8 is an exploded end view that shows a set of kart wheels 49 specifically designed to ride on the rails 44. Although not shown, the present invention may also include a set of external rails located outside the pressure chamber 11 proximal the open end of the pressure chamber 11 and a set of temporary and removable bridging rails connecting the external rails to the internal rails 44 to facilitate the movement of the kiln kart in and out of the pressure chamber 11.

I claim:

1. A wood drying device comprising:

a pressure chamber having an interior sized to support a batch of wood therein, a closed-end, an open end, and a chamber door forming an airtight seal within the pressure chamber;

an air compressor connected to the pressure chamber to provide pressure to the pressure chamber during a pressure cycle;

a vacuum pump connected to the pressure chamber to evacuate air from the pressure chamber during the vacuum cycle;

at least one recirculation fan located within the interior of the pressure chamber to circulate air within the interior of the pressure chamber;

a hot water system having a hot water radiator located within the interior of the pressure chamber, a closed and continuous hot water loop partially located within the interior of the pressure chamber and supplying heat to the radiator, a water heater located outside of the pressure chamber and connected to the hot water loop, the water heater feeding heated water into the radiator through a radiator inlet while simultaneously receiving circulated water from the radiator through a radiator outlet, and a water pump facilitating the circulated water in the hot water loop;

a cold-water system having a condenser located within the interior of the pressure chamber proximal a floor surface of the pressure chamber, a closed and continuous cold-water loop supplying chilled water to the condenser, and a cold-water radiator located outside of the pressure chamber and connected to the cold-water loop with the cold-water radiator simultaneously receiving water from the condenser and supplying chilled water to the cold-water loop, and a water pump facilitating the circulated water in the cold-water loop;

a condensate basin located within the interior of the pressure chamber underneath the cold-water loop for catching water drips from the condenser; and a condensate collection tank located outside of the pressure chamber for receiving the water drips from the condensate basin.

2. The wood drying device of claim 1 including at least one kiln kart for loading wood and supporting and moving lumber into and out from the pressure chamber.

3. The wood drying device of claim 2 including a set of internal rails firmly affixed to a bottom of the interior of the pressure chamber and wherein the kiln kart includes wheels designed to ride on the rails.

4. The wood drying device of claim 3 including a set of external rails located outside the pressure chamber proximal the open end of the pressure chamber and a set of temporary and removable bridging rails connecting the external rails to the internal rails to facilitate the movement of the kiln kart in and out of the pressure chamber.

5. The wood drying device of claim 1 including at least one wet bulb, at least one dry bulb, and at least one moisture content sensor to monitor conditions inside chamber during operations.

6. The wood drying device of claim 1 including a hose connecting the condensate basin to the condensate collection tank.

7. The wood drying device of claim 1 including a programmable logic circuit and an automatic electrical controlled valves allow for computer aided automatic control.

8. The wood drying device of claim 1 including at least two recirculation fans to circulate air over the heaters, wood, and condensate coils.

9. The wood drying device of claim 1 including a water tank located outside of the pressure chamber and connected to the hot water loop, the water tank receiving circulated water from the radiator through a radiator outlet and supplying the water to the radiator.

10. The wood drying device of claim 1 including the condensate collection tank located outside of the pressure chamber and connected to the cold-water loop with a cold-water supply tank receiving the chilled water from the cold-water radiator and supplying the chilled water to the cold-water loop.

11. A wood drying device comprising:

a pressure chamber having an interior sized to support a batch of wood therein, a closed end, an open end, and a chamber door forming an airtight seal within the chamber;

an air compressor connected to the chamber to provide pressure to the chamber during a pressure cycle;

a vacuum pump connected to the chamber to evacuate air from the chamber during the vacuum cycle;

at least one recirculation fan located within the interior of the chamber to circulate air within the interior of the chamber;

a hot water system having a hot water radiator located within the interior of the chamber, a closed, continuous hot water loop partially located within the interior of the chamber and supplying heat to the radiator, a water heater, and a water tank located outside of the chamber and connected to the hot water loop, the water heater feeding heated water into the radiator through a radiator inlet while the water tank receiving circulated water from the radiator through a radiator outlet and supplying the water to the radiator, and a hot water pump facilitating the circulated water in the hot water loop;

a cold-water system having a condenser located within the interior of the chamber proximal a floor surface of the chamber, a closed and continuous cold-water loop supplying chilled water to the condenser, a cold-water radiator and condensate collection tank located outside of the chamber and connected to the cold-water loop with the cold-water radiator receiving water from the condenser and supplying chilled water to the cold-water supply tank and the cold-water supply tank supplying chilled water to the cold-water loop, and a water pump facilitating the circulated water in the cold-water loop;

a condensate basin located within the interior of the chamber underneath the cold-water loop for catching water drips from the condenser; and a condensate collection tank located outside of the chamber for receiving the water drips from the condensate basin.

12. The wood drying device of claim 11 including a set of external rails located outside the chamber proximal the open end of the chamber and a set of temporary and removable bridging rails connecting the external rails to the internal rails to facilitate the movement of the kiln kart in and out of the pressure chamber.

13. The wood drying device of claim 12 including at least one wet bulb, at least one dry bulb, and at least one moisture content sensor to monitor conditions inside chamber during operations.

14. The wood drying device of claim 13 including a hose connecting the condensate basin to the condensate collection tank.

15. The wood drying device of claim 14 including a programmable logic circuit and an automatic electrical controlled valves allow for computer aided automatic control.

16. The wood drying device of claim 15 including at least two recirculation fans to circulate air over the heaters, wood, and condensate coils.

17. The wood drying device of claim 16 including at least one kiln kart for loading wood and supporting and moving lumber into and out from the chamber and a set of internal rails firmly affixed to a bottom surface of the interior of the chamber and wherein the kiln kart includes wheels designed to ride on the rails.

18. A wood drying device comprising:

a pressure chamber having an interior sized to support a batch of wood therein, a closed end, an open end, and a chamber door forming an airtight seal within the pressure chamber;

an air compressor connected to the pressure chamber to provide pressure to the pressure chamber during a pressure cycle;

a vacuum pump connected to the pressure chamber to evacuate air from the pressure chamber during the vacuum cycle;

at least two recirculation fans located within the interior of the pressure chamber to circulate air within the interior of the pressure chamber;

a hot water system having a hot water radiator located within the interior of the pressure chamber, a closed, continuous hot water loop partially located within the interior of the pressure chamber and supplying heat to the radiator, a water heater located outside of the pressure chamber and connected to the hot water loop, the water heater feeding heated water into the radiator through a radiator inlet while simultaneously receiving circulated water from the radiator through a radiator outlet;

a cold-water system having a condenser located within the interior of the pressure chamber proximal a floor surface of the pressure chamber, a closed and continuous cold-water loop supplying chilled water to the condenser, and a cold-water radiator located outside of the pressure chamber and connected to the cold-water loop with the cold-water radiator simultaneously receiving water from the condenser and supplying chilled water to the cold-water loop;

a condensate basin located within the interior of the pressure chamber underneath the cold-water loop for catching water drips from the condenser;

a condensate collection tank located outside of the pressure chamber for receiving the water drips from the condensate basin;

at least one wet bulb, at least one dry bulb, and at least one moisture content sensor to monitor conditions inside chamber during operations;

a programmable logic circuit and an automatic electrical controlled valves allow for computer-aided automatic control.

19. The wood drying device of claim 18 including a hose connecting the condensate basin to the condensate collection tank.

20. The wood drying device of claim 19 including at least one kiln kart for loading wood and supporting and moving lumber into and out from the pressure chamber;

a set of internal rails firmly affixed to a bottom of the interior of the pressure chamber and wherein the kiln kart includes wheels designed to ride on the rails; and a set of external rails located outside the pressure chamber proximal the open end of the pressure chamber and a set of temporary and removable bridging rails connecting the external rails to the internal rails to facilitate the movement of the kiln kart in and out of the pressure chamber.

* * * * *